United States Patent [19]

Maire et al.

[11] 4,092,395

[45] May 30, 1978

[54] METHOD OF MAKING FLUID TREATMENT MODULES

[75] Inventors: Jacques Maire, Epinay sur Seine; Robert Grémion, Saint-leu-la-Foret, both of France

[73] Assignee: Le Carbone-Lorraine, Gennevilliers, France

[21] Appl. No.: 717,402

[22] Filed: Aug. 24, 1976

Related U.S. Application Data

[62] Division of Ser. No. 553,899, Feb. 27, 1975.

[30] Foreign Application Priority Data

Mar. 1, 1974 France ................................ 74 07016

[51] Int. Cl.[2] ................................................ B29C 1/02

[52] U.S. Cl. ...................................... 264/221; 29/423; 164/132; 249/60; 249/62

[58] Field of Search ...................... 29/455 R, 428, 423, 29/455 L, 455 M; 425/DIG. 25; 249/61, 62, 60, 126, 129, 130, 160, 119, 18; 264/219, 221; 164/132, 351; 242/1, 7.01, 7.02, 166

[56] References Cited

U.S. PATENT DOCUMENTS

| | | | |
|---|---|---|---|
| 2,315,394 | 3/1943 | Brasius | 249/61 |
| 2,840,353 | 6/1958 | Muspratt | 249/62 X |
| 3,031,360 | 4/1962 | Currier | 242/7.02 X |
| 3,048,341 | 8/1962 | Freyholdt | 242/1 |
| 3,238,278 | 3/1966 | Stark | 249/18 X |
| 3,426,425 | 2/1969 | Brown et al. | 242/7.02 X |
| 3,608,046 | 9/1971 | Phillips | 249/62 UX |
| 3,861,618 | 1/1975 | Jonsson | 242/166 X |

*Primary Examiner*—Charlie T. Moon
*Attorney, Agent, or Firm*—Brisebois & Kruger

[57] ABSTRACT

This invention relates to the making of negatives intended for the production of bodies which contain cavities of predetermined shapes.

The term "negative" signifies a disposable core member, for example as used in some molding techniques such as the lost wax process. The negative at least partly matches the cavities which latter form two independent systems of regularly distributed intersecting channels with the channels in any one same system intercommunicating via ducts which are themselves regularly distributed.

The method according to the invention consists in stacking plates which are made of an easily disposable substance and are perforated with regularly distributed holes which leave between them continuous bands of said substance the intersections of which form nodes and the width of which is less than the maximum dimension of the holes: this stacking operation is effected in such a way that holes correspond with holes and nodes with nodes, and the plates are spaced apart from one another by spacers which are also made of an easily disposable substance and whose maximum cross-sectional area is the same as that of said nodes and which are positioned over each of said nodes.

The invention also extends to the negatives whenever made by the method.

9 Claims, 5 Drawing Figures

METHOD OF MAKING FLUID TREATMENT MODULES

This is a division of application Ser. No. 553,899, filed Feb. 27, 1975.

BACKGROUND OF THE INVENTION

The present invention relates to methods for making negatives which are intended for the production of bodies which contain cavities of predetermined shapes. The term "negative" as used herein, therefore signifies a disposable core member for example as used in some molding techniques.

When manufacturing such a body it is in fact a widespread practice to make a negative from an easily disposable substance which negative wholly or partly matches the cavities which it is desired to form; to then wholly or partly fill the empty spaces left in the negative with the material of which the body will finally be composed; and then to dispose of the negative.

One of the best known methods of producing such bodies is the lost-wax casting method.

The shape of the negatives will obviously depend on the shape of the cavities which it is desired to form.

A primary object of the invention is to produce negatives the structure of which makes it possible to obtain bodies that include cavities which form two independent systems of regularly distributed intersecting channels with the channels in any one system intercommunicating via ducts which are themselves regularly distributed. It is for example possible to have intersecting channels which are flat and horizontal connecting ducts which are cylindrical or polygonal and vertical. In what follows such bodies will be referred to as "modules" and may be used in the field of heat-exchanging and also in the field of filtration.

Another object of the invention is to allow the techniques of producing the negatives to be adapted to the various methods of producing the module proper, namely by applying the material of which the module is made to the negative, by injecting the material into the empty spaces left in the negative, and so on.

SUMMARY OF THE INVENTION

A first technique according to the invention for making such negatives consists in stacking up plates made of an easily disposable substance which plates are perforated with regularly spaced holes which leave between them continuous bands of the substance. The intersections of the bands form nodes and the width of the bands is less than the maximum dimension of the holes. The plates are so stacked that holes match with holes and nodes with nodes and they are spaced apart by means of spacers the maximum cross-sectional area of which is the same as that of the nodes and which are positioned over each of the nodes and the height of which is greater than the thickness of the plates.

This first technique is particularly suitable where the material forming the module is then applied to the negative in layers the thickness of which is such that the height of the spacers is equal to the thickness of one plate plus twice the thickness of the applied layer. In effect, in this case, after the said material has been applied (and after any treatment which may be needed to make it cohere) and the negative has been disposed of, a module is obtained in which one of the two independant systems of channels and their corresponding ducts is formed by a proportion of the empty space in the negative, the second system being formed by the voids left by the negative (namely the plates and spacers) when it is removed.

The number of plates and their dimensions, the size, number and distribution of the holes, and the size and number of the spacers depend on the dimensions of the module which it is desired to obtain and on the dimensions, number and geometry of the channels and ducts which it is to contain.

The holes may be of any cross-sectional shape whatever: round, square, etc. Similarly in the case of the spacers, which may be parallelepiped, cylindrical etc.

The continuous bands of substance separating the holes may intersect at any angle whatever.

The nature of the substances of which the negative (plates and spacers) is formed depend principally on the nature of the material from which the module will be formed, these substances and this material needing to be compatible in the circumstances under which the module proper is produced, and the substances of which the negative is made needing to be capable of being easily removed without damage to the material of which the module is made.

A second technique according to the invention for producing negatives may be considered as a modification of the previous technique. It consists of stacking plates which have the same characteristics as those in the previous case, but doing so in such a way that the centres of the holes in one of the plates, if projected perpendicularly, coincide with the centres of the nodes in the previous plate, the said plates being spaced apart by spacers the cross-sectional area of which is smaller than that of the holes and which are positioned over each and every node.

This second technique is particularly suitable where the material of which the module is made is introduced into the negative in such a way as entirely to fill empty spaces in it. In fact, in this case, after the said material has been introduced and possibly treated to make it cohere, and after the negative has been removed, a module is obtained in which the two independant systems of channels and their corresponding ducts are formed by the voids which are left by the negative when it is removed, each system being formed by the succession of voids which are left by pairs of non-consecutive plates and their associated spacers.

The remarks made concerning the dimensions and number of the plates, holes and spacers in the case of the first technique are equally applicable in this case, allowing of course for the changes which have to be made in view of the differences between them.

The same applies to the shape of the holes and spacers.

BRIEF DESCRIPTION OF THE DRAWINGS

In order that the invention may be more clearly understood, reference will now be made to the accompanying drawings which show some embodiments thereof by way of example and in which.

Figure 1:
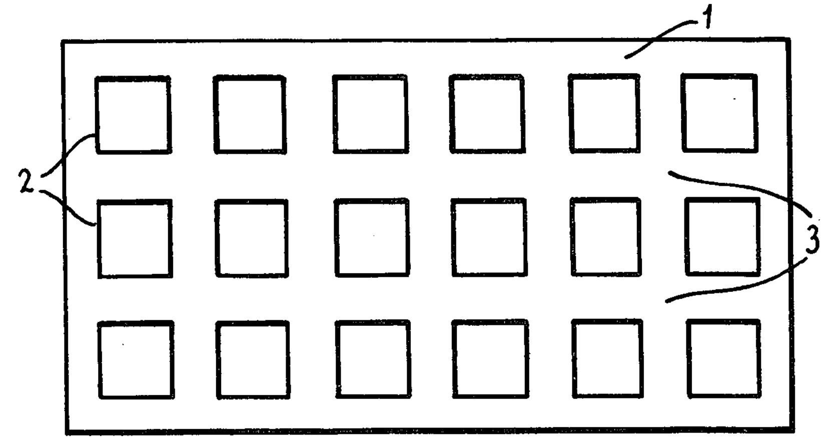
FIG. 1 shows a perforated plate with holes separated by nodes.

In the drawings, for greater clarity, the holes are of square cross-section and the spacers of circular cross-section.

SPECIFIC DESCRIPTION OF PREFERRED EMBODIMENTS

Figure 2:
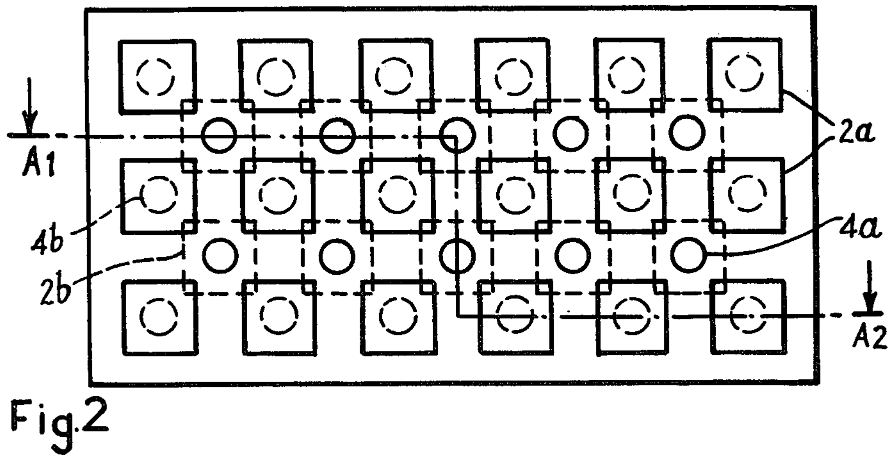
FIG. 2 shows a plan view of the stack of plates which is made.
Figure 3:
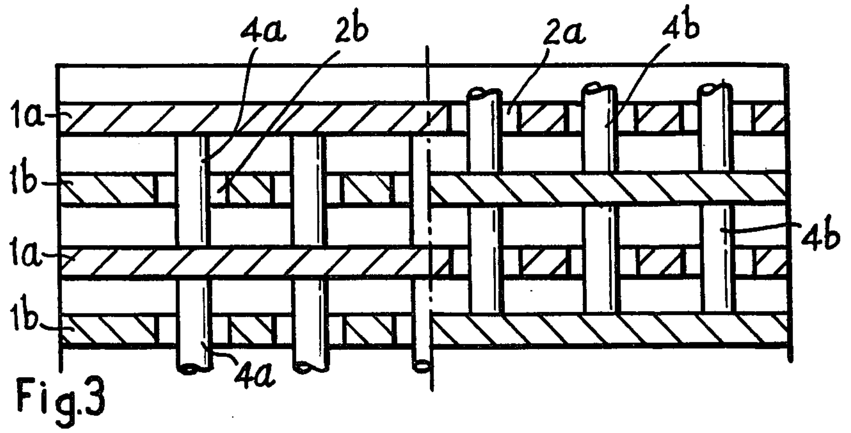
FIG. 3 shows two cross-sections, arranged contiguously side by side, through the stack, which are taken through the same plate at the levels of the holes and nodes respectively.

Referring now to the drawings, FIGS. 1, 2 and 3 are illustrative of the second technique hereinabove referred to, FIG. 1 representing a plate showing square-shaped holes 2 separated by nodes 3.

In FIGS. 2 and 3, the centres of holes 2*a* in a plate 1*a* coincide, when projected, with the centres of the nodes on a plate 1*b*. Similarly, the centres of the holes 2*b* in a plate 1*b* coincide, when projected, with the centres of the nodes on a plate 1*a*.

Over the nodes on plates 1*a* are positioned spacers 4*a* which hold two consecutive plates 1*a* apart. Similarly, over the nodes on plates 1*b* are positioned spacers 4*b* which hold two consecutive plates 1*b* apart.

The remarks made regarding the substances forming the negative in the case of the first technique are equally valid in this case. It may simply be pointed out that where the material for the module is dense, the spacers may be made of the same substance as the plates and that where the module material is compressible and needs to be compressed before the negative is removed, the spacers need to be of a substance which is more compressible than the material of the module.

Both these techniques give very good results but they have the drawback that they involve the lengthy, painstaking and costly operation of positioning the spacers at the nodes on each plate.

A first economising modification to these techniques consists in replacing the plates and spacers with plates which are perforated with holes as before but which are recessed at each node in a cylindrical, parallelepiped or other shape. Each plate as previously defined is replaced by two recessed plates which are combined in such a way that the recessed portions project from the combination, thus forming halves of spacers as used in the previous techniques.

Figure 4:
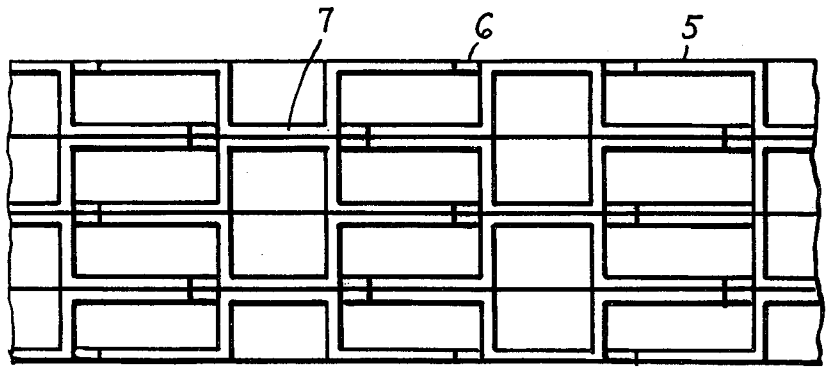
FIG. 4 shows a modification.

FIG. 4 shows this modification as a non-limiting illustration; it is a cross-sectional view of a stack of such combinations made up of plates 5 which are perforated with holes 6 and contain recessed portions 7. The stacking in this case takes place as for the second technique according to the invention.

It may be pointed out that in cases where the material of the module is dense, the stack of plates needs to be held together under light pressure so that no material can penetrate along the plane of contact between the recessed areas.

In cases where the material of which the module is made is compressible and needs to be compressed, the recessed portions are compressed at the same time.

A second modification to these techniques consists in replacing the plates and spacers by plates which are perforated with holes as before but which have at each node two reliefs which are symmetrical with respect to the plate and which each act as half a spacer. The reliefs may be of cylindrical, parallelepiped or any other shape. Having such relief, each perforated plate performs the same function as the combination of two perforated plates with recessed portions which were described in the case of the previous modification.

It may be mentioned that in cases where the material of which the module is made is not to be compressed, the plates may be of a non-compressible substance. On the other hand, when the said material is to be compressed, obviously the plates will need to be made of a compressible substance.

With all the plate systems described above the recessed plates or the perforated plates and their spacers may be stacked manually or with suitable equipment. In this case it is essential for them to be placed in a mould the cross-section of which is of identical dimensions to the plates, and when they have to alternate, for them to be trimmed.

A third technique according to the invention for producing negatives consists in winding two series of strips of an easily disposable substance alternately around a solid plate, which strips may be identical and are regularly spaced apart from one another and each series of which is wound in parallel directions, the said series of strips being wound onto the said solid plate in two alternating directions which intersect.

This technique is comparable with the first one. It is in fact particularly suitable in cases where the material forming the module is applied to the negative in layers which are thin in comparison with the thickness of the strips. As in the case of the first technique, after the said material has been applied and possibly treated to make it cohere, and after the negative has been removed, a module is obtained in which one of the two systems of channels and associated ducts is formed by a proportion of the empty space in the negative, and the second system by the voids which are left by the negative when it is removed.

Each turn of the strips forming one series as it were represents a spacer for the next turn of the strips forming the other series.

The dimensions of the solid plate, the dimensions and number of the strips and their spacing, the numbers of turns of the strips, and the angles at which the windings intersect, depend on the dimensions of the module which it is desired to obtain and on the dimensions, number and geometry of the channels and ducts which it is to contain.

Figure 5:
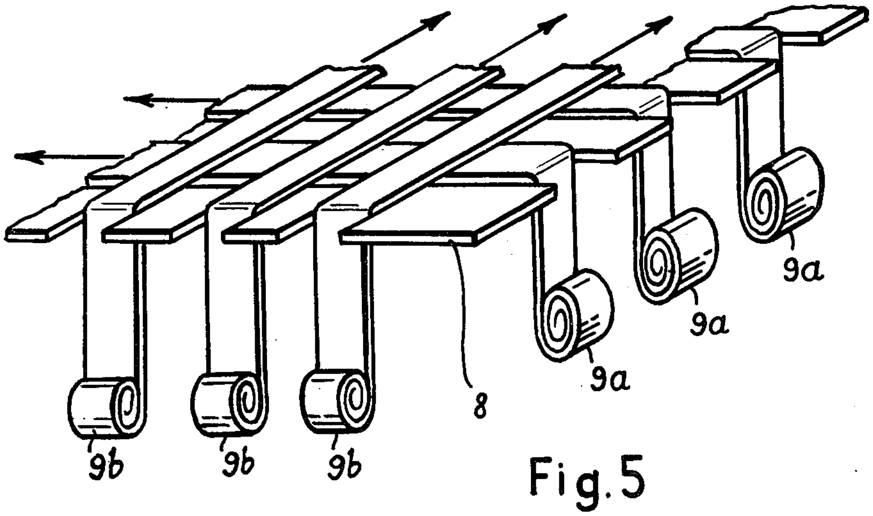
FIG. 5 shows how a third technique is operated.

FIG. 5 shows this third technique by way of non-limiting illustration. Onto a solid plate 8 two series of regularly spaced strips, 9*a* and 9*b*, are wound alternately. To make it easier to position the strips the edges of the plate may be cut out as shown in the Figure. In this instance the two series of strips are shown wound alternately in two mutually orthogonal directions.

It should be noted that with this technique two negatives, corresponding to two modules, are built up simultaneously, one on top of the plate, the other below. It is even possible to build up $2x$ negatives corresponding to $2x$ modules with this winding technique.

As with the previous techniques, the nature of the substance of which the strips consist depends chiefly on the nature of the material of which the module is made, this substance and this material needing to be compatible in the conditions under which the module proper is produced, and the substance of which the strips is made needing to be capable of easy eradication without damage to the material forming the module.

A fourth technique according to the invention for producing negatives may be considered as a modification of the third one. It consists in winding two series of strips of an easily disposable substance alternately round a solid plate under exactly the same conditions but with the various strips held apart from one another by suitable inserts.

This technique is particularly suitable in cases where the material forming the module is so introduced into the negative as completely to fill all its voids. In this case, after the said material has been introduced and possibly treated to make it cohere and the strips have been removed, a module is obtained in which the two independant systems of channels are formed by the voids left by the strips in the following manner: in any one plane of strips, one ribbon of each two goes to form the first system and the other goes to form the second system.

It should be noted that in this case, depending on the inserts used, it may sometimes be necessary to make holes for the ducts which connect the channels forming any one system in the finished module, as will be seen below.

In effect, the inserts may be of different forms, viz:

(a) they may be formed by spacers of an easily disposable substance which are positioned on each strip at the projected points of intersection with the other strips making up the same system. When the module is produced, these spacers will be eradicated along with the strips, and the voids which they leave will form the ducts between the various channels. The height of the spacers depends on the thickness required for the wall which separates the channels in one system from those in the other.

In this case a negative is obtained which is just like that obtained with the second technique and the remarks made there are equally applicable here.

The present inserts have the drawback that they require a lengthy positioning operation.

(b) they may be formed by a third series of strips of a disposable substance which are wound in another direction between each layer of strips forming the negative proper. When the module proper is produced, after the material has been fed into the voids in the negative, this third series of strips is selectively removed while the first two series of strips remain in place and is replaced in a second operation by the material forming the module. The first two series of strips are then removed.

(c) they may be formed by perforated plates of a disposable substance which perform the same function as the third series of strips in (b) and which consequently involve the same operations when the module is being made.

The perforated plates concerned may advantageously be of the same material as the module. When this is the case they remain in the module and are embedded in the material forming the module when the module is made.

(d) they may be formed by thicker strips than those forming the negative proper, these thicker strips being arranged at the sides of the windings between each layer of strips forming the negative proper, which latter are stretched over these thicker strips. Such inserts may be used only in cases where the method by which the module is produced does not cause the stretched strips to distort.

As in the previous case, the dimensions of the solid plate, the dimensions and number of the strips and their spacing, the numbers of turns of the strips, and the angles which the windings make, depend on the dimensions, number and geometry of the channels and ducts which the module is to contain. The only difference results from the inserts, the thickness of which depends on the thickness of the wall which is to separate the various channels in the module.

It should also be noted that since the angle formed between the windings may be of any size whatever, it is possible to produce negatives which give modules in which the angle at which the channels intersect may likewise be of any size whatever. This is particularly useful in cases where the module is a heat exchanger. If the channels intersect at a large angle, the streams of fluid flowing in the channels will be relatively close to parallel streams (flowing in the same or the opposite direction).

Furthermore it is possible in certain cases that the pressure of the fluids which flow in the finished module will be high and will call for channels of relatively small cross-sectional area separated by a fairly thick wall. To obtain a negative which meets these requirements it is then merely necessary to reduce the width of the strips, or if need be to replace them with wires, and to increase the thickness of the inserts.

Where the inserts are those referred to above under (b), (c) or (d), when the module has been produced it is necessary to pierce holes in it at the points where the nodes of the systems are situated, i.e. at the points where the spacers are placed in (a), so as to connect the various channels in each system together.

With this technique, as with the previous one, two negatives for two modules are built up at the same time, one on top of the plate and one below, and it is even possible to build up $2x$ negatives for $2x$ modules using the winding technique.

As with the previous techniques, the nature of the substances of which the strips and the inserts consist (when these latter have to be removed) depends chiefly on the material of which the module is to consist, these substances and this material needing to be compatible in the conditions under which the module proper is made.

It should be noted that with this technique the strips may be removed mechanically.

To seal the module at the sides, it is possible:

either, after introducing the material to form it and possibly treating it to make it cohere, to trim the four sides and bond or weld on a layer of the said material to seal the channels which open at these sides:

or, before introducing the material to form the module, to place the negative in a mould in such a way that its sides do not touch the wall.

Also, to use negatives produced with the last two techniques, the bundles of strips are clamped between two plates and the strips are trimmed at the sides.

In cases where $2x$ negatives are prepared for $2x$ modules, the $2x$ modules may be formed simultaneously and then cut up.

Finally, a few remarks may be made which apply to all the techniques:

the plates and strips employed may contain small holes which, when the module proper is made, allow bridges of material to be created between the walls which separate the various channels in the module, these bridges endowing the module with greater strength and being capable of creating turbulence in the fluids which flow through the channels, which they will do to a greater extent the more carefully the holes in the plates and strips are distributed and their cross-sections calculated.

from negatives produced with these techniques it is possible to obtain modules;

the separating walls in which may be very thin, of the order of 1mm to 1/100 mm or less, the cross-section of the channels in which may be 1mm to 1/100 mm or less, in which the flow length for the fluids may be 1/10mm to 1cm and above.

We claim:

1. A method of making a body containing cavities of predetermined shape, said cavities forming two independent systems of regularly distributed intersecting channels with the channels in any one system intercommunicating via ducts are themselves regularly distributed, said method comprising forming a negative for winding first and second series of strips made of an easily removable substance alternately around a plate, said strips being regularly spaced from one another and wound in directions which are parallel for each series, the said series of strips being wound onto the said plate in two alternating directions which intersect so that there are generally parallel spaces between the strips of each series, forming ducts in the material to connect selected strips of one of said series with selected strips of the other of said series, injecting body forming material around said series of wound strips, and removing the material of said strips after the body forming material sets.

2. A method according to claim 1, wherein selected strips of said series of strips are spaced apart from one another by insert means.

3. A method according to claim 2, wherein said insert means consist of spacers of an easily removable substance which are positioned on each strip at the projected points of intersection with other strips making up the same system.

4. A method according to claim 2, wherein said insert means consist of perforated plates made of a removable substance which plates are positioned between each layer of strips.

5. A method according to claim 2, wherein said insert means consist of perforated plates made of the same material as that of which the body containing the cavities is to be formed.

6. A method according to claim 2, wherein said insert means consist of strips of greater thickness than those forming the negative proper, which insert strips are arranged at the sides of the windings between each layer of strips making up the negative proper, the latter strips being stretched over the thicker strips.

7. A method according to claim 6 wherein the insert means consists of a third series of strips made of a removable substance, said third series of strips being wound in another direction than those of the first two series of strips between each layer of strips forming the negative proper.

8. A method according to claim 1 wherein said step of winding comprises winding the strips of the first series in spaced relation to the strips of the second series.

9. A method according to claim 1 wherein said step of forming ducts in the material, comprises inserting spacers of an easily removable material between selected strips of said first and second series before applying said body forming material, and removing the easily removable material of said spacers after the body forming material sets.

* * * * *